Figure 1:
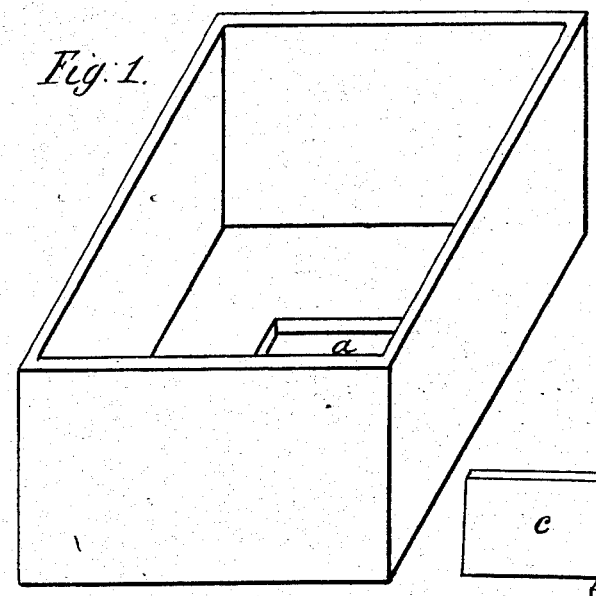
Figure 2:
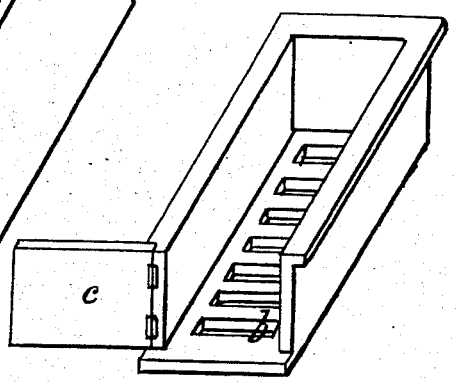
Figure 3:
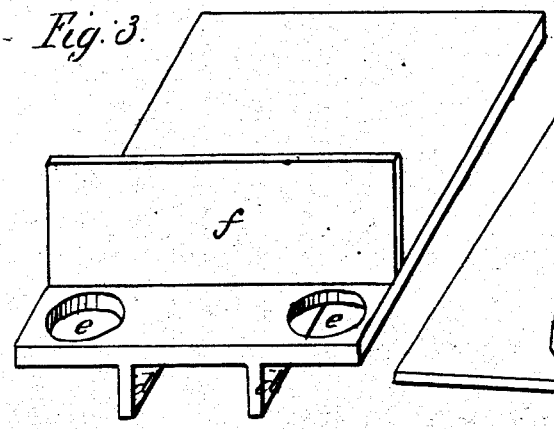
Figure 4:
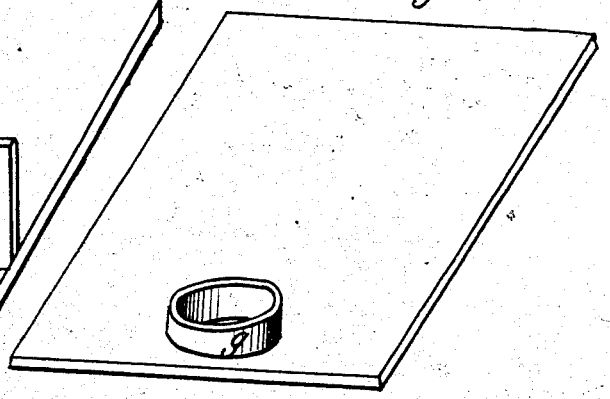

DRAFTSMAN.

126. STOVES & FURNACES,
224 Tool heaters, Flat iron,

BEST AVAILABLE COPY

G. V. Raymond.

Flat Iron Heater.

No. 4211X

Patented Sept. 29, 1825.

R. PETERS, PHOTO-LITHOGRAPHER, WASHINGTON, D. C.

United States Patent Office

PTO - BOYERS, PA Duty Station

MISSING PAGE TEMPORARY NOTICE

PATENT # X 4211 FOR ISSUE DATE 9-29-1825

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

all text bo 1-10-94

Data Conversion Operation

Boyers, Pa